Patented June 23, 1953

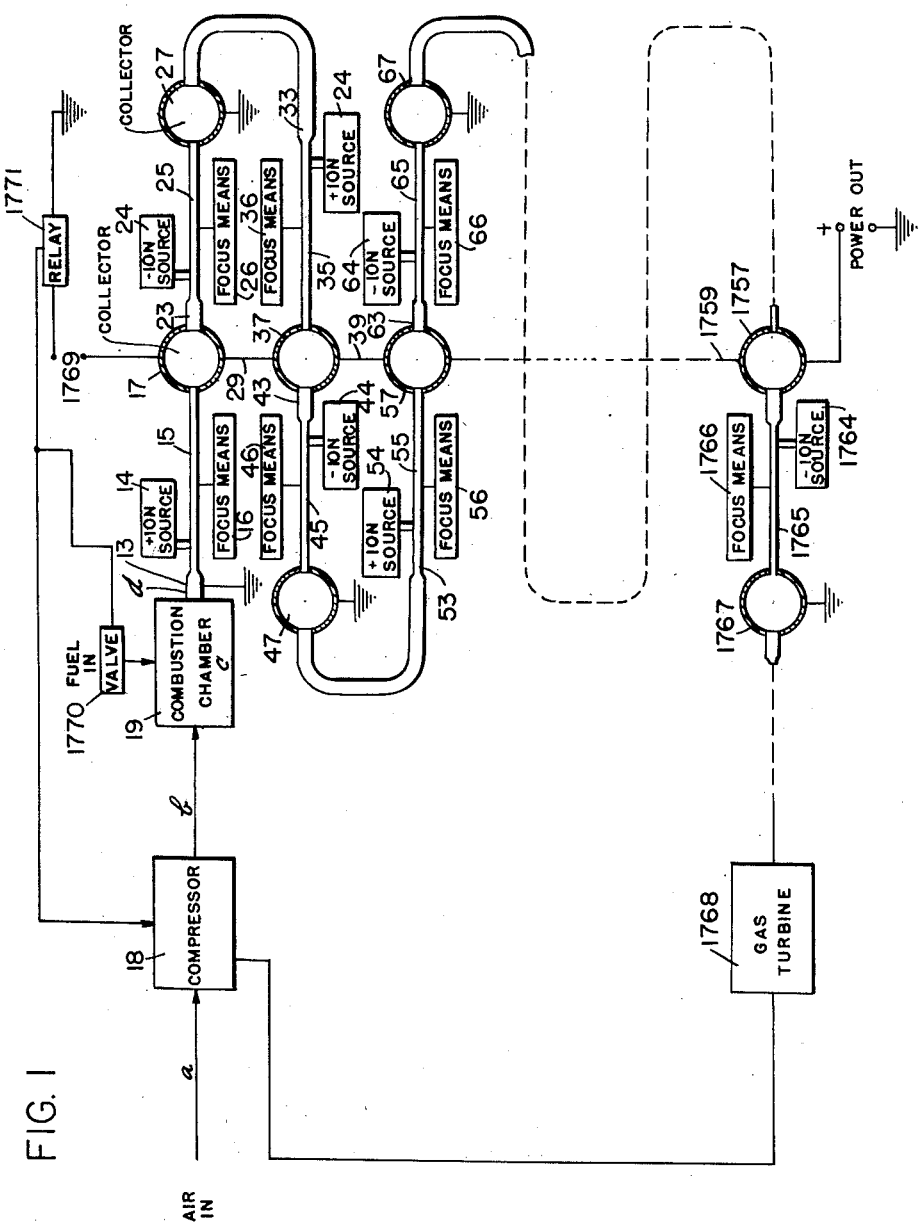

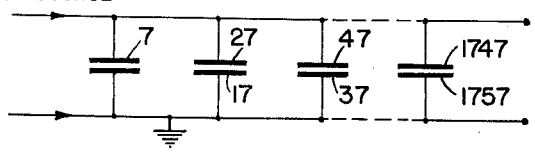
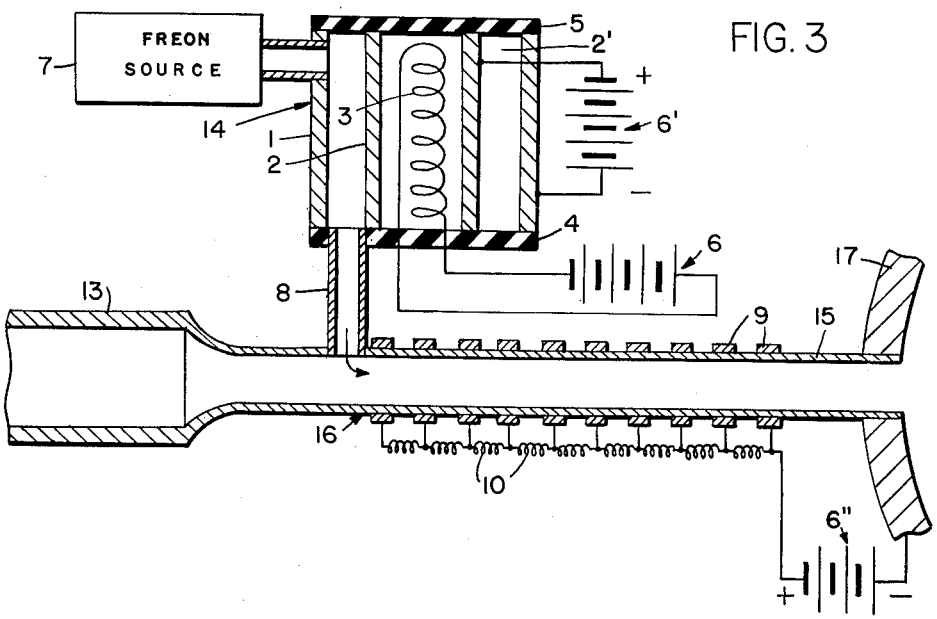
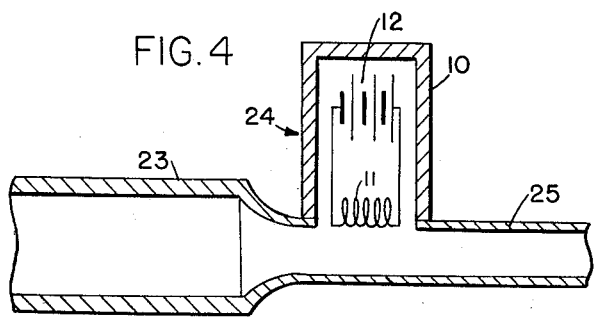
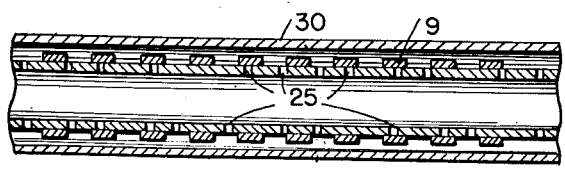

2,643,349

UNITED STATES PATENT OFFICE 2,643,349

ELECTROSTATIC VOLTAGE POWER GENERATOR

William P. Smith, Lawrence, Kans.

Application September 14, 1951, Serial No. 246,643

17 Claims. (Cl. 310—5)

This invention relates to a new method and apparatus for the generation of direct current voltage for use in commercial power systems.

More specifically, this invention relates to a method and apparatus for the thermal generation of high electrostatic voltages having appreciable power output.

The present methods of electric power generation for commercial power purposes generally fall into the categories of hydroelectric generating systems and thermal power generation systems such as those utilizing a steam turbine for driving an electrical rotating power generator.

The main object of the instant invention is to provide a novel thermal direct current generating system having much higher efficiency than the existing commercial thermal systems. (By thermal system is meant a system which converts chemical energy into electrical energy through the medium of heat energy.)

Another object of the instant invention is in providing a novel direct current power generating system involving no moving mechanical parts.

Still another object of the instant invention is in providing a novel power generating system which is both simpler and more efficient than the present non-hydroelectric generating systems.

A broad feature of the instant invention includes the carrying of ions of a given charge polarity by a high temperature, high velocity gas stream to a collector electrode where a high electrostatic potential is built up.

Another feature of the instant invention is in providing a cascaded series of electrostatic generating stages, each including an ion generating source of a given polarity, and a high speed high temperature gas stream which carries the ions by elastic collision to a collector electrode, the successive stages utilizing ions which alternate between positive and negative polarity.

Other objects and features of the instant invention will become more apparent upon making reference to the specifications to follow and the drawings wherein:

Figure 1 is a diagrammatic view, partially in blocked diagram, showing the elements making up the novel direct current voltage generating system comprising the instant invention; and Figure 2 shows a simplified equivalent circuit of the system shown in Figure 1; and Figure 3 is a cross-sectional view of a part of Figure 1 showing a positive ion generating source and a focusing means; and Figure 4 is a cross-sectional view of a portion of Figure 1 showing a negative ion emitting source; and Figure 5 is a cross-sectional view of a modification of a part of the apparatus shown in Figure 1 and includes apparatus for a cooling part of a system there shown.

Electrostatic generation of electricity in nature has manifested itself to man for countless years in the form of lightning. Man's first actual contact with the electrostatic phenomena most likely resulted from some accidental frictional effect, such as the rubbing of ebony or amber with fur. This was the first of a large number of experiments in the field of electrostatics. However, with Faraday's classic investigation of electromagnetic induction, dynamic or current electricity began to plan an increasingly important role in electrical research, and the study of static electricity lagged behind.

However, during the first quarter of the twentieth century, physicists began to be increasingly interested in the structure of the atom. Accordingly, much attention was devoted to the so-called "accelerator." It became apparent the high ion velocities were necessary in devices of this type, and one obvious method of obtaining high particle velocities was to accelerate the particle by means of a strong electric field. Other devices for the generation of voltage electrostatically were devised among which was the Van de Graaff belt type machine. All of these systems suffer from the disadvantage that it is impractical to provide energy at sufficient power levels for commercial purposes, the device merely being for the generation of high direct current voltages with extremely low current capabilities.

It is believed that the instant invention is the first electrostatic generating system capable of providing voltage with relatively high current capacity so that appreciable power could be provided.

The present invention provides a direct current voltage above one million volts at currents of one ampere and above. This direct current power then may be delivered to a remote point by means of conventional direct current transmission line, where the direct current power may be converted to a 60 cycle alternating current voltage at more usable voltage levels by means of any well-known type of electronic converter apparatus.

Very broadly, the present invention operates on the theory of moving a very large number of ions to a collector electrode by means of a high velocity, high temperature gas stream. The ions are carried to the collector electrode by elastic collision between the ions and the molecules of the gas. The heat and the kinetic energy of the gas stream is the source of the energy by which this is accomplished.

Referring now more particularly to the system shown in Figure 1, gas at a very high velocity and temperature is expelled from a conventional nozzle 13 into a conduit or tube 15 into which positive ions are ejected from an ion source 14. The high velocity gas stream carries the ions produced by source 14 to a hollow spherical collector electrode 17 where the ions are collected. The passageway of tube 15 thus communicates to the cavity within the hollow spherical electrode 17 through an opening in the wall thereof (see Figure 3 for more details).

Without a focusing means to confine the ions in tube 15, the repellant force between the ions would cause the ions to immediately impinge against the walls of tube 15 where they would return to the negative or ground point of the system, which would result in an inoperative device. To correct this defect, a focusing device 16, which will be hereinafter described, is provided. The positive ions moving into the center of electrode 17 are removed from the effect of focusing device 16 and are immediately thrown against the walls of the collector electrode by the repulsion force between the ions. The collector electrode 17 is thus charged to a high positive potential.

To provide a system having a relatively high current and a high efficiency, a plurality of units for the generation of electrostatic voltage of the type which has just been described must be provided. Thus the high velocity gas stream is caused to flow through collector 17 into a second electrostatic voltage generating stage including a nozzle device 23 which, like nozzle 13 previously described, causes a high velocity gaseous stream to flow into a tube 25 which communicates with a second hollow spherical collector 27. Instead of injecting positive ions into the second tube 25, negative ions are injected into the tube by a negative ion generating device 24. The velocity of the stream flowing into the nozzle 23 carries the negative ions to collector 27 which, therefore, becomes negative relative to the first collector 17. It is to be noted that the positive or negative ions which are carried through the respective tubes 15 and 25 are moved in a direction opposite to that in which the electric field built up in the collector tends to move these ions. The high velocity gas stream is the vehicle by which this is accomplished. This method of electrostatic voltage generation is free from any space charge effects which would tend to limit the high current capabilities of the system.

The negative collector electrodes 27, 47, etc. are grounded, their shape is not therefore critical. The shape becomes critical where the voltage of the collector relative to the ground plane is so high that there is danger of a corona discharge. A spherical-shaped electrode reduces the possibility of corona discharge. Electrodes having shapes other than spherical which reduce the possibility of corona discharge are well known in the art and may be substituted for electrodes 17, 37, etc., if desired.

The first and second electrostatic generating stages just described are repeated many times so that as many as 175 separate stages, which alternate between positive ion and negative ion injection in cascade, are utilized as shown in Figure 1. Thus, alternate collectors, 17, 37, 57, ... 1757 are charged to a high positive potential relative to alternate collectors 27, 47, 67, ... 1767. All of the positive collectors, such as 17, 37, 57, etc., are connected together electrically as by conductors 29, 39, 1759. Likewise, the negative or grounded electrodes 27, 47, 67, ... 1767 are electrically connected together. Power is coupled out of the system by means of a pair of conductors connected respectively to the positive and negative collectors as shown in Figure 1. This results in an electrostatic generating system capable of handling large amounts of power.

Figure 2 shows the equivalent circuit of the various collectors shown in Figure 1. The successive pairs of collectors are equivalent to charged plates of respective capacitors which are connected in parallel with each other.

Referring again to Figure 1, the high velocity gas stream which is caused to flow into tubes 15, 25, etc. is obtained by the use of conventional apparatus. Thus the output of an air compressor 18, which provides air at high pressure, is fed to a combustion chamber 19 to which fuel is also fed at a high pressure. The fuel is burned or oxidized by the air to provide a high temperature gas as a combustion product. This high temperature and high pressure gas flowing out of combustion chamber 19 is forced through the various tubes and nozzles in the system, and results in a high velocity gas stream. The use of a high pressure gas is needed for other reasons than the provision of a high velocity gas stream since voltages in the order of one million volts are built up between ground point and the positive collectors, and this high pressure is needed in the system to prevent voltage breakdown pursuant to Paschen's law. The high velocity, high pressure gas flowing out of the last collector electrode 1767 is fed to a conventional gas turbine 1768 which operates compressor 18.

A voltage regulator device is needed to shut off the flow of ions to the collectors when the voltage built up on the collectors reaches the desired level. This device may comprise a spark gap arrangement 1769 which, upon breaking down, energizes a relay 1771 which shuts off the compressor 18 and the valve 1770 controlling the flow of fuel to combustion chamber 19.

Referring now to Figure 3, the positive ion generating source 14, there shown, comprises two coaxial platinum cylinders 1—2, a heater 3 located within the center platinum cylinder 2 which heats the latter cylinder, and a source of halogen gas 7, such as Freon, which feeds Freon gas to the space between the inner and outer cylinders 1 and 2. The ends of the coaxial cylinders are enclosed by suitable insulation disks 4 and 5, respectively. A source of voltage 6 is coupled to the filament 3 to provide a source of electric energy by which filament 3 is heated. A direct current voltage source 6' is provided to place outer cylinder 1 at a negative potential relative to inner cylinder 2.

The Freon gas passing adjacent heated inner platinum cylinder 2 causes large amounts of positive ions to be generated. A hollow tube 8 couples the passageway of tube 15 to the intercylinder space 2' in which the ions are generated. A copious supply of positive ions is forced into tube 15 by the suction of the high velocity gas stream flowing in tube 15. It is to be noted that the specific ions generating source shown in Figure 3 is exemplary only and any other known suitable devices may be substituted therefor.

Figure 3 also shows the focusing device 16 needed to confine the stream of ions within a path generally bound by the walls of tube 15. As previously stated, without such a focusing unit, few ions would ever reach collector sphere 17 since, otherwise, the ions would immediately impinge against the walls of tube 15. Focusing device 16 comprises a plurality of spaced conductive rings 9 which are electrically connected by a series of very high impedances 10. An auxiliary direct current voltage source 6'' is coupled between the last focusing ring and the collector 17 in order to place the various focusing rings at a higher positive potential than the corresponding point in the tube 15. The rings 9 thus produce an electric field which counters the repulsion effect between the positive ions.

A similar focusing device is utilized where ions of negative polarity are in the associated tube, except that the potential which is applied to focusing rings 9 is negative instead of positive in order to counter the repulsion between negative ions.

Figure 4 discloses one exemplary embodiment of a negative ion generating device. (Other suitable ion generating source may be used if desired.) This device comprises a suitable electron emitting cathode 11 and a battery source 12 for heating the cathode 11 to produce a source of electrons. The electrons which are injected into the tube 25 are in effect gathered up by the high velocity gas stream where they attach themselves to some of the molecules in the gas giving them a negative charge. An extension 10 of the tube 25 encloses the negative ion generating source 24 to result in a pressure-tight system.

Since the temperatures of the gas throughout the system reach very high values, the walls of the combustion chamber and of the tubes 15, 25, etc. are made of a refractory material. The collectors are made of a conductive material while the tubes 15, 25, etc. are made of an insulating material.

Figure 5 shows a means for cooling the various tubes or conduits of the system.

In the embodiment shown in Figure 5, tube or conduit 25 comprises a porous ceramic material which can withstand the high temperatures present in the gas stream flowing therethrough. Coaxially surrounding tube 25 is another non-porous ceramic tube 30. The space between the inner and outer tubes 25 and 30 is filled with air at low temperature and high pressure. The high pressure air in this portion of the system is at a higher pressure than that of the gas within the conduit or pipe 25. This high pressure air communicates with the inner portion of tube 25 through the openings in the porous structure thereof, thereby confining the hotter portion of the gas stream within the center portion of the tube 25, and thereby effectively cooling the inner tube 25. This allows the ceramic material used for tube 25 to have a lower temperature capacity than it would otherwise have without such a system as described.

Focusing rings 9 envelope tube 25 in the same manner described in connection with the embodiment of Figure 3.

The collector electrode may be cooled by any well known air or water cooling system.

The specific embodiment of the instant invention, which will now be described, produces from 1,000 to 2,000 kilowatts of power at a voltage of from one to two million volts and a current of from one to two amperes.

The air compressor 18 will be of conventional design capable of compressing air to a final absolute pressure of 15 atmospheres. The gas turbine 1768 is also of conventional design.

The combustion chamber 19 may be made of any well-known refractory material. The tubes 15, 25, etc. may be made of a porous-sintered alumina ($Al_2O_3$), and the collectors may be made of copper, aluminum, etc.

The fuel fed to the combustion chamber will be fed also at a pressure of 15 atmospheres by any suitable means known in the art and, for example, could consist of natural gas having a heat content of 1126 B. t. u. per cu. ft. and a composition of:

| | Per cent |
|---|---|
| Ethane, $C_2H_6$ | 9 |
| Methane, $CH_4$ | 90 |
| Carbon dioxide, $CO_2$ | .2 |
| Nitrogen, $N_2$ | .8 |

The fuel will be mixed with theoretical air in a combustion process at an assumed flame temperature of about 4420° F. and a constant pressure of 15 atmospheres. For the fuel used, the theoretical air is 10 cu. ft. per cu. ft. of gas. At 1 atmosphere and 60° F., one pound of air occupies a volume of 13.1 cu. ft. Thus, the heat added per pound of mixture will be 1388 B. t. u. Based upon Thermodynamic Properties of Air by Keenan and Kaye, John Wiley and Sons (1945), the following points may be evaluated:

| Point (see Figure 1) | T Temperature in °F. | P Pressure in atm. | h Enthalpy in B. t. u. | v cu. ft/lb. | Density |
|---|---|---|---|---|---|
| a | 60 | 1 | 28.77 | 13.1 | 1.0 |
| b | 653 | 15 | 173.9 | 1.87 | 7.01 |
| c | 5,390 | 15 | 1,562.0 | | |
| d | 4,420 | 15 | 1,262.0 | 8.16 | 1.60 |

Here, point c in the combustion chamber is a theoretical state point for the flame temperature. However, disassociation and other effects would lower this temperature. Thus, point d at the output of combustion chamber 19 is taken as the actual state point with a temperature of about 1000° Rankin and about 300 B. t. u. lower enthalpy. In view of the recent work on disassociation at high temperatures, this figure should be considered as being on the conservative side, and the actual loss would most likely be less than 300 B. t. u.

The electrostatic generator, itself, which includes the various collectors and tubes previously discussed, consists of 176 different tubes, 15, 25 . . . 1765, each furnishing 10 milliamperes at 1 megavolt or 10 kilowatts power. The gas stream flowing every two adjacent tubes is reversed in direction by means of a U tube as shown in Figure 1 so that the system is relatively compact. If desired, instead of the series flow shown in Figure 1, sets of series in parallel gas flow may be used. Obviously, positive ions must be transported in one-half of the tubes and negative ions in the other half.

Each tube, 15, 25, etc., is 6 feet long having an inner entrance diameter of 1.5 inches tapering gradually to an exit diameter of 1.6 inches.

For a length of 6 feet and a potential of 1 megavolt, the axial strength is 5450 volts per cm. With a gas density of 1.6, the relative ion velocity will be 179 ft./sec. assuming an ionic mobility of 1 cm./sec./volt/cm. This means that the net ion velocity will be 179 ft./sec. less than the velocity of streaming gas (since the gas moves the ions by means of elastic collision). Since the net ion velocity of at least 1000 ft./sec. is desirable, the minimum gas velocity should be in the vicinity of 1180 ft./sec. The maximum gas velocity must be sufficient to compensate for the loss of energy due to friction in the tubes.

For the size tube of 6 feet in length, 1.5 inches for the diameter at the input end and 1.6 inches at the output end, the initial velocity in the tube is about 1670 ft./sec.; and the velocity at the output end is about 1130 ft./sec. The maximum velocity at 1670 ft./sec. corresponds to sonic velocity at a temperature of about 500° F.; and since the exit temperature of the gas from the final tube of the generator will be taken at about 1100° F., all flow in the electrostatic generator will be subsonic.

The design of nozzles 13, 23, 33, 43, 53, 63 . . . 1753, etc. are such that the velocity of gas at the entrance of each tube of associated stage is about 1670 ft./sec. Since the velocity of the gas stream tends to be reduced as it flows through a particular stage, the cross-section area of the various tubes is gradually tapered outwardly from the input end to the output end as previously described. Since the temperature is determined by the value of enthalpy and since the gas velocity and the tube are fixed quantities, the pressure at any point may be determined by the relation $PV=RT$. The tabulation of the conditions at every tenth tube is as follows: where $h_a$ is the enthalpy of a gas at the entrance of a particular tube, and $h_b$ is the enthalpy of gas at the exit of each tube, $T_A$ is the absolute temperature at the input of each tube and $T_B$ is the absolute temperature at the output of each tube. $P_A$ is the absolute pressure at the input of each tube and $P_B$ is absolute pressure at the output of each tube.

| Tube | $h_A$ B.t.u. | $h_B$ B.t.u. | $T_A$ °F. | $T_B$ °F. | Approximate | |
|---|---|---|---|---|---|---|
| | | | | | $P_A$ atm. | $P_B$ atm. |
| 1st | 1,206.0 | 1,230.6 | 4,240 | 4,320 | 12.6 | 16.1 |
| 10th | 1,156.4 | 1,181.0 | 4,075 | 4,160 | 12.2 | 15.5 |
| 20th | 1,101.3 | 1,125.9 | 3,895 | 3,970 | 11.7 | 14.9 |
| 30th | 1,045.8 | 1,070.4 | 3,710 | 3,790 | 11.2 | 14.3 |
| 40th | 990.6 | 1,015.2 | 3,530 | 3,610 | 10.7 | 13.7 |
| 50th | 935.3 | 960.1 | 3,345 | 3,430 | 10.2 | 13.1 |
| 60th | 881.0 | 905.6 | 3,165 | 3,245 | 9.75 | 12.4 |
| 70th | 826.3 | 850.9 | 2,985 | 3,065 | 9.25 | 11.8 |
| 80th | 771.2 | 795.8 | 2,895 | 2,875 | 8.75 | 11.2 |
| 90th | 716.1 | 740.7 | 2,610 | 2,690 | 8.25 | 10.6 |
| 100th | 661.0 | 685.6 | 2,421 | 2,505 | 7.75 | 9.9 |
| 110th | 605.9 | 630.5 | 2,231 | 2,316 | 7.24 | 9.3 |
| 120th | 550.8 | 575.4 | 2,040 | 2,126 | 6.71 | 8.7 |
| 130th | 495.7 | 520.3 | 1,847 | 1,934 | 6.20 | 8.0 |
| 140th | 440.6 | 465.2 | 1,651 | 1,739 | 5.66 | 7.4 |
| 150th | 385.5 | 410.1 | 1,453 | 1,542 | 5.15 | 6.7 |
| 160th | 330.4 | 355.0 | 1,251 | 1,342 | 4.60 | 6.1 |
| 170th | 275.3 | 299.9 | 1,045 | 1,138 | 4.04 | 5.4 |
| 176th | 242 | 266.6 | 919 | 1,013 | 3.70 | 4.94 |

The focusing rings' association with each tube may consist of 91 focusing rings each of centimeter width and operated from the adjacent ring by one centimeter.

Each potential ring will be maintained at a potential of 50,000 volts above the potential of the corresponding point along the tube about which the rings are mounted; thus referring to Figure 3, power supply source 6″, which extends between collector electrode 17 and the last ring there shown, will be a 50,000 voltage source (low current capacity). Various other stages will have similar design characteristics except that the polarity of potential applied to the rings in the case of a tube having negative ions will be reversed as previously described.

With such a system as above described, the over-all efficiency is somewhere in the range from 45 to 62 per cent which is a great deal higher than other thermal-type direct current power generating systems which have an efficiency no higher than about 35 per cent. It is to be noted that many modifications may be made of the various specific embodiments above described without deviating from the broader aspects of the instant invention.

For example, all of the collector electrodes of the same polarity could be made into one large spherical electrode rather than separate spherical electrodes as shown.

Also, if desired, additional voltage generating stages could be added on to the 176th stage which includes collector 1767. In such case, it is improbable that sufficient energy would result to operate compressor 18 through gas turbine 1768. In such case, compressor 18 could be run by other well-known prime moving sources.

Also, heat sources other than combustible fuel may be used to provide a high temperature, high pressure gas stream. For example, heat from an atomic pile or the like may be used to heat the air provided by compressor 18.

I claim:

1. An electrostatic direct current generating system comprising a hollow conduit made of an insulating material, an ion generating source at one end of said conduit for placing ions of a given polarity in said conduit, a charge collecting electrode at the other end of said conduit for collecting the ions impinging thereon, means extending entirely along said conduit between said ion generating source and said charge collecting electrode for opposing the repulsion effect between ions of like polarity to focus said ions in the center of said conduit along the length thereof, means connected to said one end of said condut for generating a high velocity stream of gas within said conduit moving towards said collecting electrode to carry said ions to said collector electrode whereby a high direct current voltage is built up on said collector electrode by the charge accumulated thereon.

2. A direct current power generating system comprising the combination of a first voltage generating stage including a first hollow conduit made of an insulating material, an ion generating source at one end of said conduit for placing ions of a first given polarity within said conduit, a first charge collecting electrode at the other end of said conduit for collecting the ions impinging thereon, means for generating a high velocity stream of gas within said conduit to carry said ions to said first collector electrode, said first collector electrode having at least one opening therein adjacent the said other end of said conduit to allow passage of said high velocity gas stream therethrough, means for focusing the ions in said conduit into a beam in the center portion of said conduit, a second voltage generating stage including a second hollow conduit made of an insulating material in communication with said opening in said first collector electrode whereby a high velocity gas stream is caused to flow into said second conduit, a second ion generating source coupled to said second conduit for placing ions in said latter conduit having a polarity opposite to those of the ions generated by said first ion generating source, means associated with said second conduit for focusing the ions therein into a beam in the center portion of said second conduit, power output terminals respectively coupled to said first and second collector electrodes.

3. The combination of claim 2 characterized further by additional pairs of voltage generating stages similar to said first and second voltage generating stages coupled in the same order and in cascade with said first and second voltage generating stages and utilizing the same high velocity gas stream as generated in said first and second stages, conductor means coupling the collector electrode of the same polarity together whereby a high capacity power generating system results.

4. The combination of claim 1 characterized further by said collector electrode comprising a hollow conductive surface with said conduit communicating with the cavity inside said hollow electrode surface.

5. The combination of claim 2 characterized further by said collector electrodes being hollow conductive surfaces with the associated conduits communicating with the inner portion thereof.

6. The combination of claim 3 characterized further by said collector electrodes being hollow surfaces with the associated conduits communicating with the inner portions thereof.

7. The combination of claim 1 characterized further by said focusing means comprising a plurality of conductive rings spaced at intervals between the ion source and collecting electrode, means for placing a potential on said rings of the same polarity as the ions in the associated conduit and at a higher potential than the corresponding point within the conduit.

8. The combination of claim 2 characterized further by said respective focusing means each comprising a plurality of spaced conductive rings, means for placing a potential on said rings of the same polarity as the ions in the associated conduit at a higher potential than the corresponding point within the conduit.

9. The combination of claim 1 characterized further by said gas stream generating means including a source of gas at a high pressure means for heating said gas to a high temperature, nozzle means coupled between said source of gas and said conduit whereby a high temperature, high velocity gas is caused to flow in said conduit.

10. The combination of claim 2 characterized further by said gas stream generating means including a source of gas at a high pressure, means for heating said gas to a high temperature, a nozzle coupled between said gas source and the conduit of the first stage, a nozzle coupled between the collector of said first stage and the input to the conduit of the second stage to speed up the flow of the gas passing therethrough.

11. The combination of claim 10 characterized further by said source of gas at high pressure including a compressor device for compressing the gas to said high pressure, a gas turbine connected to said compressor to operate same, means coupling the moving gas stream from the last voltage generating stage to said compressor to operate it.

12. The combination of claim 3 characterized further by a nozzle coupled between the collector electrode of one stage to the conduit of the succeeding stage to speed up the flow of the gas passing therethrough.

13. The combination of claim 3 characterized further by said gas stream generating means including a source of gas at a high pressure, means for heating said gas to a high temperature, a nozzle coupled between said gas source and the conduit of the first stage, a nozzle coupled between the collector of said first stage and the input to the conduit of the second stage to speed up the flow of the gas passing therethrough.

14. An electrostatic direct-current generating system comprising a plurality of cascaded voltage generating stages each including a charge collector electrode, an ion generating source, a hollow conduit made of an insulating material for transmission of the ions emitted by said ion source to said charge collector coupled between said ion generating source and said charge collector, means for generating a high velocity high temperature gas stream within said conduit for carrying said ions to said charge collector whereby a high direct-current voltage is built up on said collector electrode by the charge accumulated thereon, a gas stream generating means coupled to the input of the conduit of the first stage including a compressor for compressing a gas to a high pressure means for heating the gas to be fed to said first stage to a high temperature, a gas turbine connected to said compressor to operate it, means coupling the moving gas stream from the last voltage generating stage to said compressor to operate it, means connecting each of said stages together so that a single gas stream flows through the cascaded stages.

15. A direct-current power generating system comprising the combination of a first voltage generating stage including a first hollow conduit made of an insulating material, an ion generating source at one end of said conduit for placing ions of a first given polarity within said conduit, a first charge collecting electrode at the other end of said conduit for collecting the ions impinging thereon, means for generating a high velocity stream of gas within said conduit to carry said ions to said first collector electrode, said first collector electrode having at least one opening therein adjacent the said other end of said conduit to allow passage of said high velocity gas stream therethrough, a second voltage generating stage including a second hollow conduit made of an insulating material in communication with said opening in said first collector electrode whereby a high velocity gas stream is caused to flow into said second conduit, a second ion generating source coupled to said second conduit for placing ions in said latter conduit having a polarity opposite to those of the ions generated by said first ion generating source, power output terminals respectively coupled to said first and second collector electrodes, additional pairs of voltage generating stages similar to said first and second voltage generating stages coupled in the same order and in cascade with said first and second voltage generating stages and utilizing the same high velocity gas stream as generated in said first and second stages, conductor means coupling the collector electrode of the same polarity together whereby a high capacity power generating system results.

16. The combination of claim 15 characterized further by said collector electrodes being hollow conductive surfaces with the associated conduits communicating with the inner portion thereof.

17. The combination of claim 15 characterized further by a nozzle device connected between the collector electrode of one stage and the conduit of the next stage to speed up the flow of the gas passing therethrough.

WILLIAM P. SMITH.

References Cited in the file of this patent

UNITED STATES PATENTS

| Number | Name | Date |
| --- | --- | --- |
| 1,353,037 | Goddard | Dec. 21, 1920 |
| 1,964,738 | McCreary | July 3, 1934 |
| 2,004,352 | Simon | June 11, 1935 |
| 2,208,217 | Landerholm | July 16, 1940 |
| 2,210,918 | Karlovitz et al. | Aug. 13, 1940 |
| 2,308,884 | Lindenblad | Jan. 19, 1943 |